(12) United States Patent
Chantry et al.

(10) Patent No.: US 10,144,080 B2
(45) Date of Patent: Dec. 4, 2018

(54) TORCH FOR ELECTRIC ARC WELDING OR PLASMA CUTTING SYSTEM

(71) Applicant: LINCOLN GLOBAL, INC., City of Industry, CA (US)

(72) Inventors: Bruce Chantry, Solon, OH (US); Jeffrey L. Kachline, Highland Heights, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 581 days.

(21) Appl. No.: 14/627,731

(22) Filed: Feb. 20, 2015

(65) Prior Publication Data
US 2015/0158109 A1 Jun. 11, 2015

Related U.S. Application Data

(63) Continuation-in-part of application No. 13/833,968, filed on Mar. 15, 2013, now abandoned, which is a
(Continued)

(51) Int. Cl.
*B23K 9/00* (2006.01)
*B23K 9/013* (2006.01)
(Continued)

(52) U.S. Cl.
CPC ............ *B23K 9/013* (2013.01); *B23K 9/0953* (2013.01); *B23K 9/1056* (2013.01); *B23K 9/173* (2013.01); *B23K 9/28* (2013.01); *B23K 9/291* (2013.01)

(58) Field of Classification Search
CPC .... B23K 9/013; B23K 9/0953; B23K 9/1056; B23K 9/28; B23K 9/291; B23K 10/00; B23K 10/02
(Continued)

(56) References Cited

U.S. PATENT DOCUMENTS 4,608,482 A 8/1986 Cox et al.
4,742,470 A 5/1988 Juengel
(Continued)

FOREIGN PATENT DOCUMENTS

EP 0508482 A2 10/1992
EP 0854006 A1 7/1998
(Continued)

OTHER PUBLICATIONS

Friedl (WO 2000/044523), 2000, machine translation, performed Aug. 8, 2017.*
(Continued)

*Primary Examiner* — Brian Jennison
(74) *Attorney, Agent, or Firm* — Perkins Coie LLP

(57) ABSTRACT

A cutting system including a plasma arc torch having an electrode, nozzle, and a gas conduit through which gas is transferred to a torch tip. The torch includes at least one of a sensor and a set circuit, where the set circuit stores a parameter related to the torch. The system also includes a power supply outputting a cutting waveform to the electrode via an electrical connector to initiate a working arc. The working arc creates a plasma arc using the gas. The system further includes a controller that controls an output of the power supply and a feeding of the gas through the gas conduit based upon input from a user input device positioned on at least one of the torch and the power supply. The controller monitors at least one usage parameter. The system additionally includes a memory device that is coupled to the controller. The memory device stores data related to the at least one usage parameter.

26 Claims, 9 Drawing Sheets

Related U.S. Application Data continuation of application No. 11/210,286, filed on Aug. 25, 2005, now Pat. No. 8,431,862.

(60) Provisional application No. 61/944,747, filed on Feb. 26, 2014.

(51) Int. Cl.
*B23K 9/10* (2006.01)
*B23K 9/28* (2006.01)
*B23K 9/095* (2006.01)
*B23K 9/173* (2006.01)
*B23K 9/29* (2006.01)

(58) Field of Classification Search
USPC ............................................. 219/130.5
See application file for complete search history.

(56) References Cited

U.S. PATENT DOCUMENTS

| | | | |
|---|---|---|---|
| 5,512,726 A | 4/1996 | Arantes et al. | |
| 6,315,186 B1 | 11/2001 | Friedl et al. | |
| 6,479,793 B1 | 11/2002 | Wittman et al. | |
| 6,498,321 B1 | 12/2002 | Fulmer et al. | |
| 6,758,423 B1 | 7/2004 | Perkins et al. | |
| 6,841,752 B2 | 1/2005 | Ward | |
| 6,855,914 B1 | 2/2005 | Kaufman et al. | |
| 6,992,262 B2 * | 1/2006 | Matus ................ | B23K 10/006 219/121.39 |
| 2003/0029851 A1 * | 2/2003 | Suzuki ................ | B23K 9/26 219/130.01 |
| 2003/0093503 A1 | 5/2003 | Yamaki et al. | |
| 2004/0173583 A1 * | 9/2004 | Iriyama ................ | H05H 1/26 219/121.53 |
| 2004/0232128 A1 | 11/2004 | Niedereder et al. | |
| 2004/0245230 A1 | 12/2004 | Huismann et al. | |
| 2005/0103768 A1 | 5/2005 | Ward | |
| 2005/0199605 A1 | 9/2005 | Furman et al. | |
| 2006/0196862 A1 | 9/2006 | Sickels | |
| 2012/0012564 A1 | 1/2012 | Mao et al. | |
| 2013/0264320 A1 | 10/2013 | Shipulski et al. | |

FOREIGN PATENT DOCUMENTS

| | | |
|---|---|---|
| EP | 1117279 A1 | 7/2001 |
| EP | 1522371 A | 4/2005 |
| EP | 1601238 A | 11/2005 |
| JP | 63-114823 A | 5/1988 |
| JP | 6-23550 A | 2/1994 |
| JP | 7-68423 A | 3/1995 |
| JP | 7-276062 A | 10/1995 |
| JP | 2004 181493 A | 7/2004 |
| JP | 2004-322127 A | 11/2004 |
| WO | WO 9526251 A | 10/1995 |
| WO | WO 1998/34751 A1 | 8/1998 |
| WO | WO 2000/44523 A1 | 8/2000 |
| WO | WO 2002/47860 A1 | 6/2002 |
| WO | WO 2003/002296 A1 | 1/2003 |

OTHER PUBLICATIONS

International Search Report and Opinion, PCT/IB2015/000221, dated Aug. 11, 2015, 11 pages.
Chinese Patent Application No. 200610121839.6, Office Action, 12 pages, dated Jun. 6, 2008.
European Patent Application No. 06017495.0, Extended European Search Report, 9 pages, dated Jan. 5, 2007.

* cited by examiner

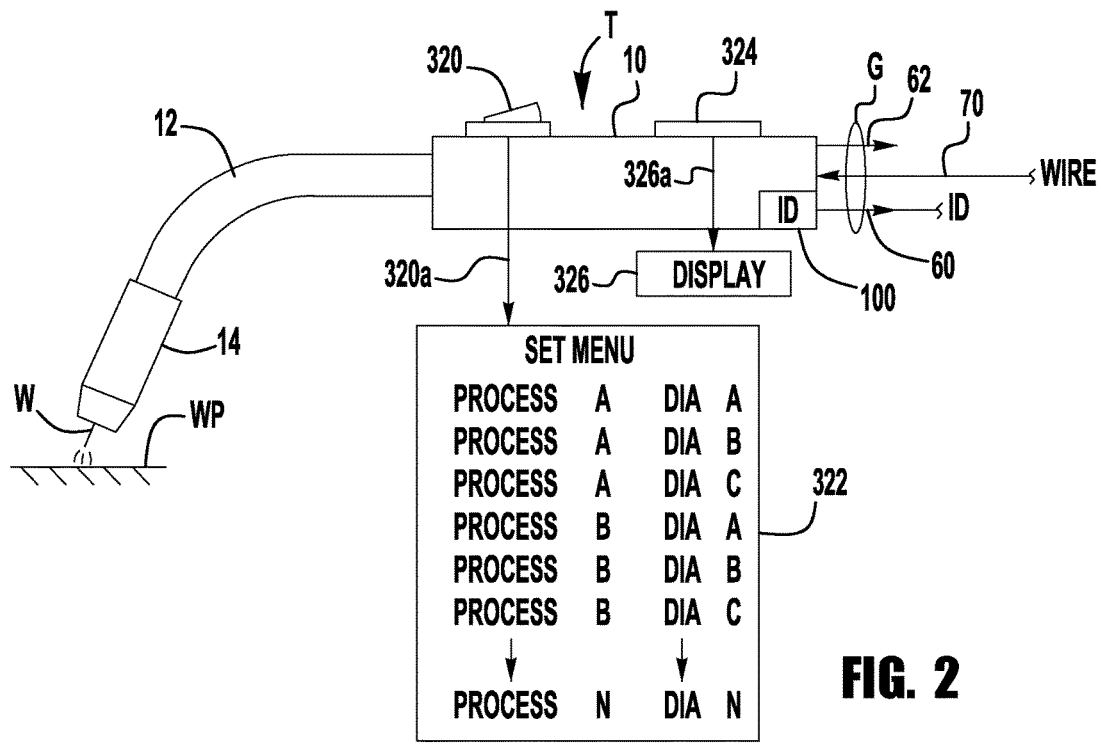
FIG. 2
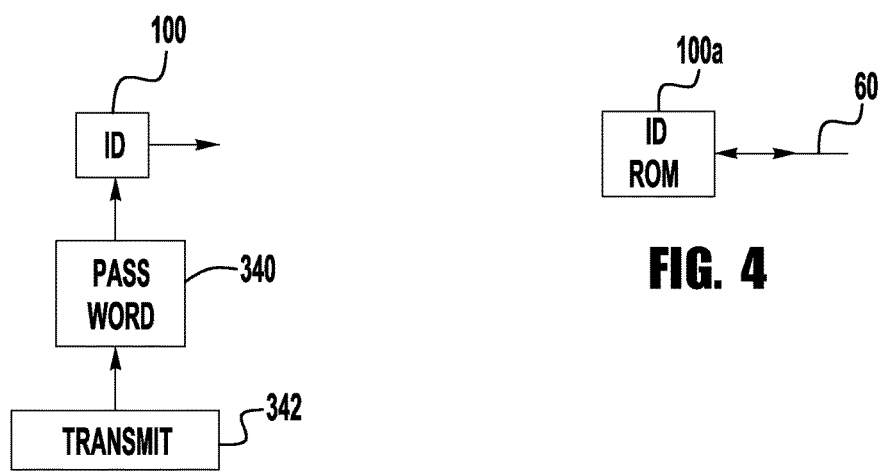
FIG. 3
FIG. 4

TORCH FOR ELECTRIC ARC WELDING OR PLASMA CUTTING SYSTEM

PRIORITY

The present application claims priority to U.S. Provisional Patent Application No. 61/944,747, which is incorporated herein by reference in its entirety. This application is a continuation-in-part of prior application Ser. No. 13/833,968, filed on Mar. 15, 2013, which is a continuation of prior application Ser. No. 11/210,286, filed Aug. 25, 2005, now U.S. Pat. No. 8,431,862, the disclosures of which are incorporated by reference herein in their entirety.

The present invention relates to welding or cutting torches and more particularly to a unique torch specially designed for increasing the transfer of intelligence between the torch and a power supply system adapted to receive the torch.

BACKGROUND OF INVENTION

The invention involves the design of a unique torch for use with an electric arc welding or cutting system where the torch has special abilities to communicate with the welding system and the system is adapted to receive the torch. In many applications, components of the welding and/or cutting system deteriorate over time, and eventually fail. This failure often occurs without warning to the user and can result in damaging the workpiece such that work will need to be repeated. Further, failures can result in undesired downtime.

Further limitations and disadvantages of conventional, traditional, and proposed approaches will become apparent to one of skill in the art, through comparison of such approaches with embodiments of the present invention as set forth in the remainder of the present application with reference to the drawings.

THE INVENTION

Embodiments of the present invention relate generally to welding and/or cutting systems which use an intelligent process in which there is communication between the torch and the power supply/control system such that the control system monitors and tracks the use of the torch and its relative components. The power supply/control system then uses this information to inform a user regarding the remaining life or imminent failure of a torch component. This allows a user to be warned of an imminent failure of an important component to allow the user to replace it before failure. This and other aspects of embodiments of the present invention are discussed in more detail below.

BRIEF DESCRIPTION OF DRAWINGS

The above and/or other aspects of the invention will be more apparent by describing in detail exemplary embodiments of the invention with reference to the accompanying drawings, in which:

FIG. 2 is a schematic illustration of certain structures employed in the embodiment shown in FIG. 1;

FIGS. 3 and 4 are block diagrams illustrating representative techniques for loading identification codes into the torch shown in FIGS. 1 and 2;

PREFERRED EMBODIMENTS

Figure 1:
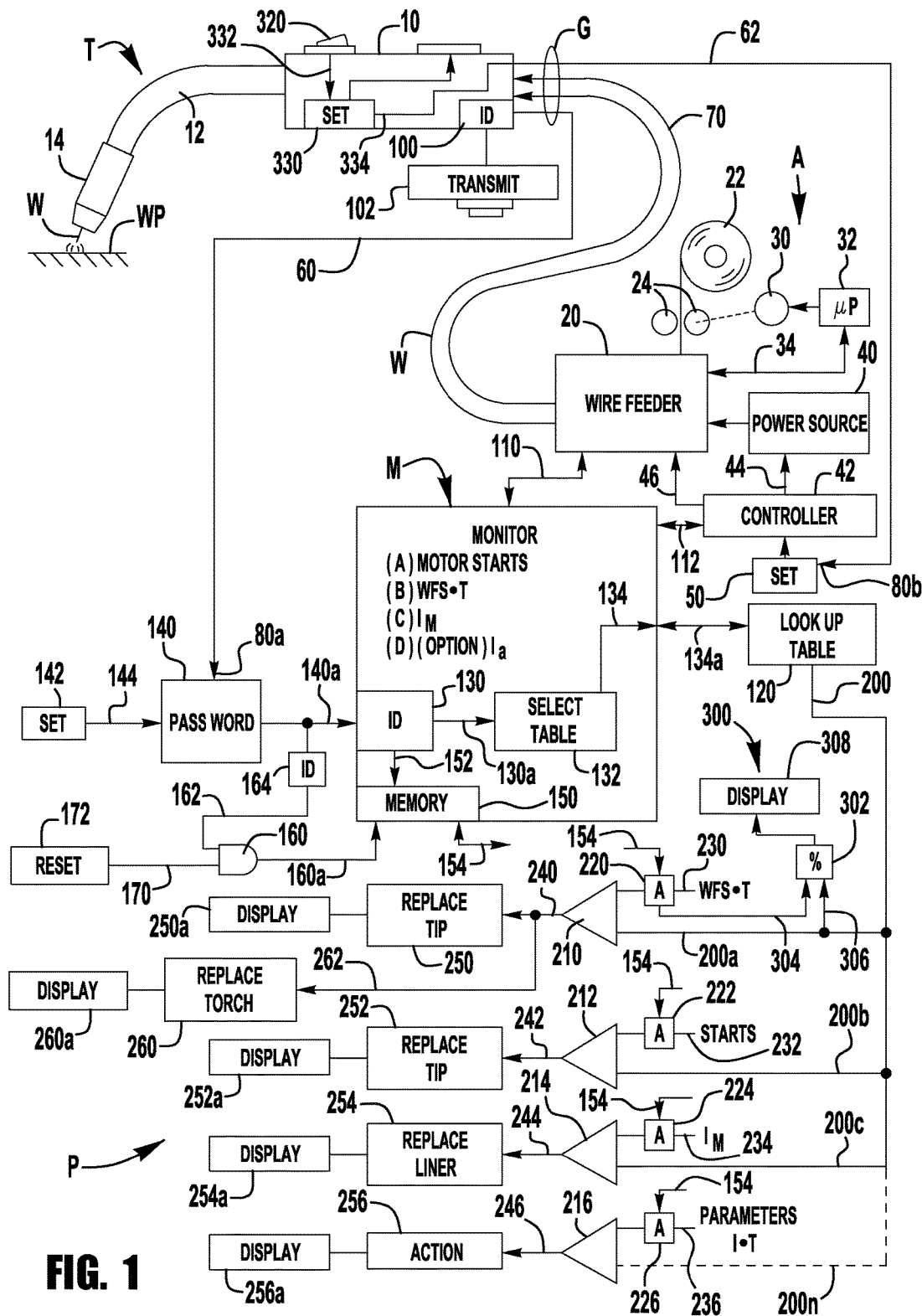
FIG. 1 is a schematic, combined wiring and block diagram illustrating a first embodiment of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

As an initial matter it is noted that the term "gun" is used in the welding and cutting industry to describe an elongated, flexible harness called the "cable" comprising an isolation tube with a rear end connectable to a power supply system of the type including a power source with a controller and a wire feeder (in welding systems). The front end of the "gun" has a torch to perform the desired operation. The terms "torch" and "gun" are often used interchangeably to mean either the welding/cutting head or the whole unit. Generally, in the following description, the welding head is called a "torch." However, in some instances the term "gun" may be used herein to describe the head. In any event, the context of which the terms are used herein will sufficiently explain how the terms are used.

It should also be noted that discussions of the various embodiments below are discussed in relation to either welding or cutting systems, as examples. However, embodiments are not limited in this way. That is, discussions below regarding exemplary welding systems can be implemented and utilized in cutting systems, and descriptions and discussions below regarding exemplary cutting systems can be implemented and utilized in welding systems without departing from the spirit or scope of the present invention. For purposes of clarity and efficiency the below exemplary embodiments are not discussed separately for both welding and cutting systems.

In accordance with the present invention the torch at the end of the gun is modified and especially designed to communicate with a power supply system also designed for receiving the special type of torch. Thus, the torch has a special design and the system has an input terminal structure or receptacle communicated with special architecture and components in the system to identify the special torch and receive information in digital format from the torch. The information is used to operate the controller of the system. Consequently, in one feature of the invention, the torch includes an internal register or memory having a unique digital identification code or other means to communicate its identity to a specially designed system. By (a) allowing the torch to identify its unique characteristics and/or its specific identity and (b) communicating data from the torch through a digital channel to the system, several unique capabilities are made possible. The special torch and modified system constitute companion components facilitating communications between the two components for the purposes of enhancing the overall efficiency of the operation and improving the quality control and inventory requirements for the torch itself.

In accordance with one aspect of the invention, the torch is connected to an electric welding system having a wire feeder with a feed motor, a power source and a weld process controller for the power source and the wire feeder to cause a selected welding process. The torch has a memory device for storing an identification code unique to the torch and a transmission line or communication channel to output the identification code in digital format. A unique receptacle with a plug and receptacle having a unique pin pattern allows connection of the torch, through an elongated tube or gun, to the welding system. The welding system to which the torch is connected by a unique receptacle has a torch monitoring device with an input terminal connected to the transmission line or channel when the torch is connected to the system. This monitoring device has an input decoder circuit to identify the torch and to activate the monitoring program tailored to the particular torch being identified. In this aspect of the invention, the monitoring device includes at least one accumulator for totaling a first torch use factor based upon a selected weld parameter or combination of parameters. A circuit is used to enable the accumulator when a specific torch is connected to the input terminal of the weld system. The accumulator has an output signal representing the total of the major parameter. A program selected by connecting the specific torch creates or outputs a limit value for the use factor being monitored. A comparator network is provided with a first input being the accumulator output signal and a second input being the limit value from the selected program determined by the actual torch connected to the welding system. The comparator network creates an action signal when the output of the accumulator reaches the limit value from the selected program. In this manner, the torch is connected to the welding system and the monitor is operated based upon a selected program coordinated with a particular torch. When a torch use factor being monitored reaches a given value, an action signal is created. The action signal indicates a corrective action to be taken, such as changing the liner of the gun, changing the contact tip of the torch or replacing and/or refurbishing the total torch. Consequently, whenever a given torch is connected to the welding system, a monitor measures one or more use factors. The use factors are stored until the next use of the particular unique torch. Ultimately, the torch, either during a single application or subsequent uses of the same torch, will pass a use factor limit value to identify an action to be taken, such as maintenance of the particular torch. In accordance with an aspect of the invention, the condition of the use factor can be displayed at the monitor or at a remote location by a hard wire or e.g., an Ethernet communication network. Consequently, whenever a torch is applied to the welding system, the identification code is read by the welding system and the monitor is initiated to accumulate a use factor or factors for the particular, unique torch.

In accordance with another aspect of the present invention, the torch, with a unique identification stored in memory or register, can also include a manually operated input device on the torch itself to create an output signal with digital data identifying a specific weld (or cutting) process. A communication channel directs data from the torch to the controller where a circuit shifts the weld process of the controller. In this manner, an input set circuit responsive to the digital data from the torch sets the weld process of the controller to a specific weld process selected at the torch. In this embodiment of the invention, the weld process selected at the torch is based upon the type of process and the diameter and/or type of welding wire for the particular process. Thus, an operator indexes the torch between weld processes and diameters or types of wire at the torch itself. Then, the torch transmits such data from the torch to a set circuit of the controller so the controller is set to perform the process selected at the torch. Consequently, the identification code stored in the torch is used to select the monitor and monitor the operation of the torch, while the torch itself is used to set the particular weld process of the controller used for controlling the power source and/or the wire feeder.

An object of this aspect of the invention is the provision of a torch which has an identification code transmitted to the welding system for actuating a monitor to maintain information regarding historical use of the torch. Furthermore, the torch is provided with a process selector so the operator can convert process data into digital information and transmit such data through an information channel to the set circuit for the power source controller of the welding system. Thus, the individual torch is monitored and the torch is used, alternatively, to control the actual weld process performed by the welding system.

In a second embodiment of the invention, the torch does not have a stored identification code, but it has a communication line or channel directly attached to the set input circuit of the power source controller. Consequently, by merely connecting the gun with a front end torch to the welding system, the communication channel with the controller is established. The welding system in this embodiment of the invention does not have a torch monitor, but has a controller with an input set circuit that can be actuated by a gun having a particular input communication line or channel designed to match the receptacle at the input of the welding system. The rear end of the gun is connected to the wire feeder using a special connector with matching plug and receptacle. Consequently, in this second embodiment of the invention, the torch is merely connected to the electrical welding system. The torch has a set up device for manually selecting the welding parameters of the welding process and a line communicating the selected parameter in digital format to the torch itself. From the torch, the digital data is directed through a communication line coextensive with the tube comprising the gun. The line extends from the torch to the controller to thereby set the parameters from the torch in the controller to perform the weld process. The set up device can be separate from the torch to adjust the value of parameters, such as wire feed speed, current and voltage and accessories, such as the type of gas. These parameters and accessories are loaded manually into the set up device which device is then connected to the memory of the torch. The torch memory device communicates this information to the input set circuit of the controller in the welding system. A specially designed torch is necessary, since only a special torch can have the communication line extending from an internal memory device storing the parameters through the special receptacle of the welding system. In another application of this concept, the set up device is loaded with an identification code which can be used as defined above to enable the circuit for accepting data when the torch having such data is used. In accordance with an aspect of the invention, the set up device is a separate unit that merely introduces the set parameters and the torch identification code into a memory, such as through a touch memory button on the torch. The data is thereby loaded into the torch for subsequent use when the torch is connected to a welding system. Connection is allowed by a communication port in a connector on the system. This connector is unique to the communication line from the torch and includes a plug and receptacle with a matching unique pin pattern. By using this second embodiment, other operating features can be incorporated with the torch.

In one implementation, a torch can be loaded with a set of parameters for the weld process. Thus, whenever this torch is connected to the welding system the controller is automatically set to perform the desired weld process. This modification has an advancement where a toggle mechanism on the torch toggles between a plurality of sets of parameters. Then the parameter set is selected by the toggle mechanism and is connected to the weld system. The controller is automatically shifted to the desired parameters. Another implementation involves a personal parameter setting device or module. A welder has his own monitor. When he is ready to weld, he merely loads the parameters from his own module into a torch. The torch is thereby set to the parameters tailored by the welder. This loads these personal parameters into the controller by connecting the torch to the welding system by way of a special connector at the rear end of the flexible tube or gun.

A third embodiment of the invention involves a torch for connection to an electric welding system, as defined above. The torch has a register with a unique identification code, in digital format so that the torch is connected by communication channel to an interface module activated by a given code and/or codes. One code that activates the interface is the unique code of a particular torch connected to the welding system. The interface has an output that sets the weld process parameters. The output channel of the interface transmits digital data to the controller that has a set up circuit for storing the transmitted digital data as control parameters for the power source. Thus, by merely connecting a particular torch to the welding system, the torch is identified and is allowed to activate an interface module. This module sets the parameters in the controller used by the welding system. The identification code for the torch is in memory or register on the torch and is directed through a unique connector to the ID terminal of the interface module. The controller is set in response to the identification code stored on the individual torch. Another aspect of such a torch is the setting of the weld parameters on the torch itself. The parameters are selected and optionally displayed on the torch; however, they are also communicated to the interface for the purposes of changing the parameters stored in the interface modules. Thus, the torch is identified and activates the interface to operate the controller. As an option, the torch itself is normally adjusted to change the output parameter of the interface. Consequently, the torch by being connected to the welding system activates an interface to set the controller to the desired parameters, which parameters may or may not be changed manually by a welder at the torch itself.

In accordance with a fourth embodiment of the invention, a unique torch design is provided wherein the torch itself can include a monitoring system. A first sensor in the torch measures the level of arc current and a second sensor in the torch also measures the level of the wire feed speed to the torch. These measurements multiplied by time are accumulated to create use factors as explained in connection with the first embodiment. A memory unit associated with the torch itself stores the use signal or signals and a monitor reads the use signals. This monitor can be in the form of a touch memory button. The use factor information is stored on the torch and is read from the torch or displayed on the torch. Consequently, the torch can be interrogated to determine how much use it has experienced and whether it is capable for a subsequent, long term welding application. By this embodiment of the invention, the torch carries with it a use history which is readable directly or indirectly from the torch. This ability to know the use history of a torch is of substantial benefit for inventory control. Furthermore, it prevents a torch from being placed into an application for which it does not have residual life to complete.

A fifth embodiment of the invention is a torch with a unique identification code stored in the torch itself. This code is used with a controller including a closed loop circuit to control the weld parameters, such as current and/or voltage and a network to create a special weld procedure. The torch, with the unique identification code stored on the torch, creates an output signal which is decoded for identification by the welding system. Receipt of the proper code creates a network enabling signal. This can be accomplished by connecting the lead carrying the unique identification code from the torch to the welding system. By attaching the novel torch, the network enabling signal is created by a decoded identification of the proper torch. This signal activates the network and converts the controller to the special weld procedure. In this manner, a particular torch designed for a given special operation of the controller is the only type of torch which can activate the special alternative weld procedure. This embodiment of the invention assures that a special torch is used when a special welding process is implemented by the welding system.

In accordance with another embodiment of the invention, a cutting system includes a plasma arc torch having an electrode, nozzle, and a gas conduit through which gas is transferred to a torch tip. The torch includes at least one of a sensor and a set circuit, where the set circuit stores a parameter related to the torch. The system also includes a power supply outputting a cutting waveform to the electrode via an electrical connector to initiate a working arc. The working arc creates a plasma arc using the gas. The system further includes a controller that controls an output of the power supply and a feeding of the gas through the gas conduit based upon input from a user input device positioned on at least one of the torch and the power supply. The controller monitors at least one usage parameter. The system additionally includes a memory device that is coupled to the controller. The memory device stores data related to the at least one usage parameter.

In accordance with another embodiment, a method of cutting includes creating a working arc using a plasma arc torch having an electrode, nozzle, and a gas conduit through which gas is transferred to a torch tip, the torch including at least one of a sensor and a set circuit, where the set circuit stores a parameter related to the torch. The method also includes providing a cutting waveform from a power source to the electrode via an electrical connector to initiate the working arc using the gas, and inputting user preferences on at least one of the torch and the power supply. The method further includes controling the cutting waveform and a feeding of the gas through the gas conduit based upon the user preferences. The method also includes monitoring at least one usage parameter, and storing data related to the at least one usage parameter on a memory device. The at least one usage parameter includes information related to at least one of a usage time of the torch, a cutting amperage, a number of arc starts, a number of torch pierces, a number of side cuts, and an operating anomaly event.

These and other designs of the torch for a welding system are aspects of the present invention which will be described in more detail later. Further, the above referenced embodiments (discussed in more detail below) can be adapted and used in a plasma cutting system (absent the wire feeder) by those of skill in the art without departing from the spirit and scope of the present invention.

A first exemplary embodiment of the invention is shown in FIGS. 1 and 2 wherein specially designed torch T has a handle, illustrated as a broomstick type handle 10, with an outwardly extending gooseneck 12 terminating in a lower nozzle 14 through which welding wire W is pushed toward workpiece WP to perform a welding process between welding wire W and the workpiece WP. As is normal in the welding industry, welding system A is in communications with torch T and includes a wire feeder 20 having a supply of welding wire 22 pulled by feed rolls 24 driven at a wire feed speed determined by motor 30 under the control of microprocessor 32. The microprocessor receives wire feed speed commands through control lead 34 normally connected to wire feeder 20 and having an internal microprocessor control chip not illustrated. To provide current for the welding operation, system A includes power source 40 with controller 42 having output lead 44 for controlling the operation of the power source and lead 46 for controlling the operation of wire feeder 20. The controller itself can provide the information on lead 34 to set the speed of the motor 30 so the desired wire feed speed is used in accordance with the needs of the particular welding process being performed by system A. Torch T is connected to the front end of the elongated, flexible cable or gun G having an outer sheath covering designated leads 60, 62 which leads constitute a unique structure to the present invention. Gun G also houses moving welding wire W and power lead 70 as is common in the welding industry. The rear end of elongated gun G is connected to system A by special connectors 80a, 80b to accept the special designated leads 60, 62. The connectors are one unit with a plug and receptacle with matching pin patterns. The gun also has a trigger lie to start the welding operation. Of course, the gun also provides a gas passage for shielding gas to be provided at the welding operation if the welding operation is not self-shielding. As so far described, torch T and system A are standard welding components except for the designated leads 60, 62 and the special combined connectors 80a, 80b used to accept the rear end of gun G carrying not only a wire W, power lead 70 and a gas conduit, but also designated leads 60, 62. In operation, controller 42 operates wire feeder 20 and power source 40 for driving wire W through torch T as a designated welding process is performed. The process has specific parameters, such as current voltage and wire feed speed dictated by the setting of controller 42. Into this standard architecture, the present invention is incorporated.

In accordance with the invention, torch T includes an internal memory or storage register 100 for storing an identification code. The code is indicative of particular unique torch T. By depressing transit button 102, the unique torch specific digital code in memory or register 100 is transmitted through designated line 60 to portion 80a of the combined connector. This connector is at the input of monitor M for monitoring the operation of the unique torch T. Monitor M includes a digital processing device, such as a DSP or microprocessor, to perform the functions hereinafter explained after receipt of digital data from controller 42 by way of inputs 110 and 112. Input 110 reads and retrieves appropriate data from wire feeder 20, while input 112 reads and retrieves appropriate data from controller 42. This data is processed by monitor M to generate information regarding the operation of torch T. The torch information is used for servicing and inventory purposes associated with the particular unique torch T. Monitor M has an internal digital decoder 130 connected to the input of connector portion 80a. The decoder outputs on line 130a the identity of the particular torch T connected to connector portion 80a. This information is generally related to the specific torch. It is directed by lead 130a to a select table routine or program 132 so that data on output line 134 identifies a unique, specific torch T. This information is directed by line 134a to a look up table 120 storing multiple programs, each of which includes a limit value for a torch of the general type used as the specific unique torch T. To assure that only that type of torch is capable of communication with monitor M, line 60 is communicated to a password circuit 140 set to a series of different types of torches that are capable of activating monitor M. This type of special torch T is provided by program 142 so that the information on line 60 passed to the identification digital decoder 130 is the identity of torch T and the particular type of the torch. This password of the type of torch can be provided at register 100 as described in FIG. 3. Monitor M is informed of the specific torch T and the type having values stored in lookup table 120. Monitor M also includes an internal memory 150 connected by line 152 to the input decoder circuit 130 to obtain the identity of the specific torch. Thus, memory 150 stores information specific to the unique torch T. Memory 150 writes the identification code from memory 100 into a register and accumulates information developed by monitor M for the particular torch. The memory 150 has I/O line 154 to input and store information relating to the particular unique torch T and to output this stored information associated with a particular torch identified by the input decoding circuit 130. The stored data of a particular torch is outputted on I/O line 154. When torch T is a new torch or has been refurbished and therefore requires clearing of existing stored information in memory 150, the memory is reset by a program represented by gate 160 having output line 160a. A reset logic on line 160a resets memory 150 for the particular torch identified by the digital data on line 152. Gate 160 has a first input line 162 from decoder 164 for decoding the digital information on line 140a and providing a logic 1 on input 162 for the particular torch T connected to connector portion 80a. The other input to gate 160 is the logic on line 170 from the reset program 172. The program produces a logic 1 on line 170 when a new or refurbished torch T is first used in the combination illustrated in FIG. 1. Thus, the information on line 154 is the accumulated information for a particular torch T. When a new torch is used, a reset signal on line 160a resets memory 150 for the new torch. Monitor M then monitors the operation of the new unique torch T.

Monitor M has an internal program for monitoring the operation of each specific torch T identified by the code data, appearing in line 152. The type torch from the input code activates line 130a to select a program stored in lookup table 120. A variety of program architecture can be used for monitoring various conditions of torch T; however, in this first embodiment of the present invention, as illustrated in FIG. 1, communication line 154 reads the accumulated stored values for the torch identified by line 152 and writes additions to these stored values. This update procedure for historical data for unique torch T is obtained by outputting particular limit values for various parameters associated with the type of torch selected by password device 140. These limit values are outputted from lookup table 120 on line 200 and are separated by output circuits, not shown, for value limit select lines 200a, 200b, 200c and 200n. The data on these lines control comparator networks 210, 212, 214, and 216, respectively. Thus, the comparator networks monitor certain limit values from lookup table 120 associated with a particular type of torch and these limit values are used in the output program P of monitor M for the specific torch T identified by data on line 152. Comparator networks 210-216 have associated digital accumulators 220, 222, 224 and 226, respectively. In practice, at least one accumulator and comparator is used for practicing the first embodiment of the invention; however, preferably several comparators and accumulators are used so that many historical and operational characteristics of torch T can be monitored simultaneously. The accumulators are driven by inputs 230, 232, 234 and 236, respectively, driven by parameters and/or events. Thus, the action signals on output lines 240, 242, 244 and 246 indicate when the associated comparator changes logic because the accumulator associated with the comparator exceeds the limit values outputted from lookup table 120. The action signal logic on lines 240, 242, 244 and 246 activate action identification registers 250, 252, 254 and 256, respectively. The state of these action registers is shown on associated display devices 250a, 252a, 254a and 256a, preferably located on a remote console; however, they can be associated with the welding system or actually displayed on the torch itself. All of these implementations of program P are within this first embodiment of the present invention. In the illustrated embodiment, the wire feed speed from the magnitude signal on line 34 is multiplied by time and directed by input line 260 to comparator 210. Thus, when the accumulated wire feed speed and time product reaches a given level from lookup table 120 as it appears on line 200a, the logic signal on line 240 changes state and records an action which, in this example, is a "replace tip" action. Thus, the amount of wire fed to the torch is used to determine when the contact tip of the torch should be replaced. In a like manner, the logic on line 240 is also directed to action identification register 260 by line 262. This action register indicates that the torch should be replaced. This action is revealed by display device 260a. In practice, either line 240 or line 262 is used to determine the action to be taken when a certain amount of wire has been driven through the torch T. Either the tip is replaced or the torch is replaced according to the particular action identification signal employed. Whenever motor 30 is started, the event is recorded in accumulator 222. A certain number of start events indicates when the tip should be replaced. When this number is reached, the logic on line 242 is shifted to display a replace tip action requirement for torch T. In some instances, it is advantageous to measure the current of motor 30. Increased motor current is generally caused by liner friction in elongated gun G. Liner friction is the characteristic controlled by comparator network 214. Increase in the current of motor 30 is recorded. When the current reaches a certain level, the logic changes on line 244. In this instance, the accumulator 224 is merely recorded. When the current of motor 30 reaches a certain level, as found outputted from the lookup table for a particular type torch T, the logic on line 244 shifts. This indicates that the liner for torch T should be replaced. This is the message of action register 254. Thus, the parameters of torch T monitored by monitor M can either be an arithmetic magnitude or an accumulated level. A generic use of the present invention for parameters is indicated by the last example. Comparator network 216 is actuated by any parameter "n" associated with use of torch T. The accumulated amount of parameter n is compared to a level or value for parameter n on line 200n. This generic parameter can be current multiplied by time to indicate the amount of energy processed by the unique torch T. Other parameters are within the intent and scope of the invention. The parameters and events shown in FIG. 1 are only representative of the nature and of the type of historical information of torch T contemplated in practice at this time. Whenever torch T is connected to the welding system A, the output from I/O line 154 updates all of the accumulators to the value stored in memory 150 for the particular torch. Memory 150 maintains a history of torch T for each of the parameters and events in program P. When the torch has been refurbished or a new torch is inserted with the same identification number, memory 150 is reset by a program represented by gate 160, as previously described.

In accordance with an aspect of the invention, monitor M also provides life meter 300 determining the remaining anticipated life of the torch T before it should be replaced. Life meter 300 includes register 302 that decreases from 100% to 0% by sensing the output of one of the accumulators. As illustrated, the accumulator 220 is read by line 304, together with the limit value for the product of wire feed speed and time. This value appears on line 306. The output of register 302 indicates the amount of life remaining for the particular torch T. This life percentage is displayed by device 308 or is recorded on torch T or with respect to torch T for future use in inventory management. Program P can take other forms; however, the computer program, as described, is the preferred implementation of the first embodiment of the invention.

In accordance with another aspect of torch T, it has a separate and distinct function wherein the torch is connected to the welding system A to provide parameters on designated line 62. Parameters, in digital format, are selected in torch T and transmitted by line 62 to set-up circuit 50 of controller 42. In this separate and distinct function of torch T, the torch is a companion to system A. Communication lead 62, runs through elongated gun G from the front end at torch T to the rear end at connector portion 80b. Since system A has the receptacle component of the connector portion 80b, it can communicate with torch T by designated line 62. This line communicates parameters that are used by controller 42 to cause the desired selected welding process to be determined by information from torch T. In accordance with this feature of the first embodiment, torch T is constructed as shown in FIGS. 1 and 2. An index device 320 progresses through menu 322 by index commands on line 320a, as best shown in FIG. 2. The menu indexes between the process to be performed and the diameter or type of wire to be used. According to the indexed position on menu 322, a signal through line 332 corresponds to the desired process and wire diameter and/or type and is provided from menu 322. This data signal is communicated with a programmable set circuit or memory 330. This set circuit or memory outputs parameters, such as current, voltage and wire feed speed, by line 334 to designated communication channel 62. In this way, parameters selected on the torch are communicated to input set up circuit 50. Thus, torch T is modified to set the welding process wire size and/or wire type by creating parameters used by controller 42 during the welding process. This is a separate and distinct feature associated with torch T. In accordance with this feature, the torch has a manual set up device or storage memory 330. This device stores the welding parameters for a given welding process as provided by the index position of menu 322. Line 334 communicates the selected, stored parameters from device 330, in digital format, to line 62 for communicating the stored parameters from the torch to controller 42. This structure sets parameters into the processing unit of controller 42 by circuit 50. Thus, parameters stored in torch T are used by the controller to implement a desired welding process. The same torch has an identification code in register 100 which is communicated with the controller through monitor M. In practice, menu 322 and menu indexer 320 are part of the torch; however, they can be separate from the torch.

As shown in FIG. 1, password device 140 adds to the identification code a password for the classification or type of torch attached to system A by connector 80a, 80b. In FIG. 3, this torch type code is loaded into identification register 100 from a password device 340 by transmit device 342. In a like manner, the register 100a can be a read only memory which is loaded at the manufacturer and read from line 60 to set decoder 130 of monitor M. The manufacturer can also load a type code with a torch identification code in read only memory 100a. These two modifications of the code read/write register 100 and read only memory 100a are illustrated in FIGS. 3 and 4. These showings are representative of various schemes for loading the torch code and type code into the data storage device in read only memory 100a for communication from torch T to system A. Other minor changes in the first embodiment of the invention shown in FIGS. 1 and 2 and the modifications regarding communication of parameters to system A can be made without departing from the intended spirit and scope of the first embodiment of the invention.

Figure 5:
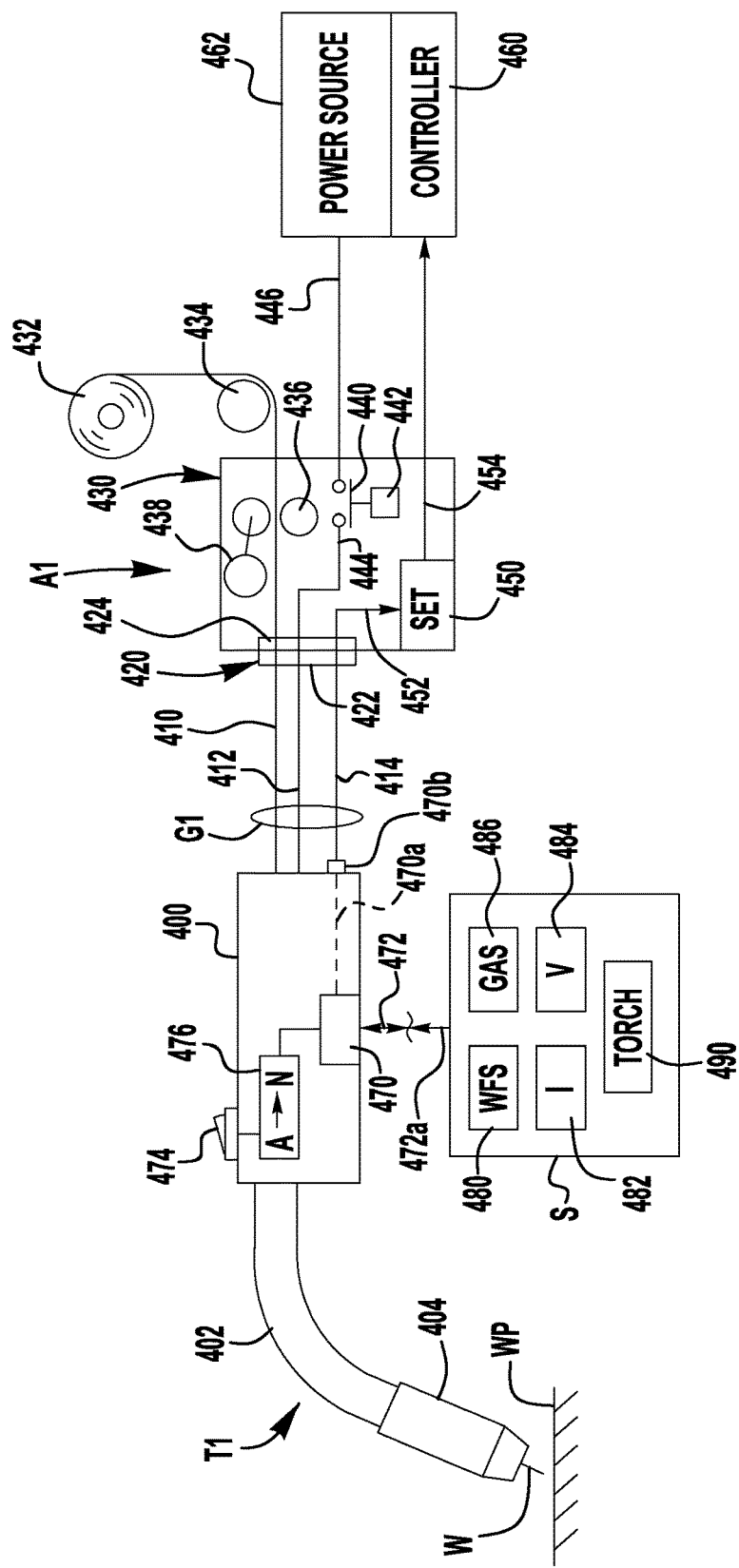
FIG. 5 is a schematic, combined wiring diagram and block diagram illustrating a second embodiment of the present invention.

The present invention involves connecting a specially designed torch with a specially constructed welding system so that communication occurs between the torch and system to enhance overall efficiency and control of the welding process accomplished by operating the welding system. In FIG. 5, a second embodiment of the invention is illustrated. This is the preferred embodiment. Unique torch T1 has set up devices for manually selecting weld parameters for the welding process. A line 472 communicates selected parameters, in digital format, to the torch T1. Line 414 communicates the torch stored parameters, in digital format, from torch T to the controller 460 whereby the torch stored parameters are used by the controller to implement the process. To accomplish this objective, the rear end of the gun G1, including torch T1, includes a connector 420 with a plug 422 matching a companion adapter 424 on the welding system. Thus, the relationship between torch T1 and system A1 is such that the torch can control at least some of the parameters used in the welding system. These parameters are manually set, at the torch, by selector device S.

Details of this second embodiment of the invention are shown in FIG. 5. Torch T1 has handle 40 terminating in gooseneck 402 with end nozzle 404. This torch is the front end of elongated gun or cable G1 housing power lead 412, welding wire 412 and communication line or channel 414. Of course, gas is communicated through gun G1 to torch T1 when shielding gas welding is being performed. To assure that the proper torch is connected to dedicated welding system A1, a connector 420 has an input side or plug 422 at the rear end of gun G1 and an output side or receptacle 424. This connector is used at the intersection between gun G1 and welding system A1. The prong or pin pattern of input 422 matches the prong or pin pattern of output 424. Consequently, the proper torch and system are connected. The attributes and features of novel torch T1 are, thereby, facilitated. In accordance with somewhat standard practice, welding system A1 includes wire feeder 430 having a supply reel 432 of welding wire W. The wire is pulled over capstan 434 by feed rolls 436 to push wire W through gun G1 to torch T1 at a speed WFS determined by wire feed motor 438 controlled by a microprocessor in accordance with the description of the first embodiment illustrated in FIG. 1. Contactor 440 is standard and includes solenoid 442 to activate contactor 440 when the trigger (not shown) on handle 400 is depressed to close contactor 440. Of course, a trigger lead passes through gun G1 when the torch is used for a manual welding operation. The starter system for automatic welding, such as used with a robot, merely closes contactor 440 by a solenoid 442 in accordance with a start signal. When contactor 440 is closed, lead 444 which is an extension of power lead 412 is connected to lead 446 from power source 462. Wire feeder 430 also includes an input set circuit 450 which may or may not have a code enabling front end, but does have an input 452 which is an extension of communication line 414 and an output line 454, which is a line connected to controller 460 for power source 462. Thus, lead 454 from circuit 450 sets selected parameters or operating features of power source 462 by inputting digital information to controller 460. Power source 462 outputs welding current on line 446. Parameters necessary for performing a selected welding operation between wire W and workpiece WP are stored in torch T1.

In accordance with the second embodiment of the invention, torch T1 includes a digital register 470 having a write line 472 to write data information into the register from selector device or set up device S and a read line 470a attached by connector 470b to communication line 414. Devices can be part of the torch or a separate unit as illustrated in FIG. 5. Buttons 480, 482 and 484 are capable of setting certain weld parameters, such as wire feed current and voltage, for communication with controller 460 by line 414 from torch T1. Furthermore if a particular gas is to be employed, button 486 is adjusted to select the desired gas, which is normally $CO_2$ and/or argon. Optionally, this button can adjust the rate of flow of the gas, as digital data, loaded into register or memory device 470 through write line 472. If a separate unit, device S has output terminal 472a for information transfer to line 472. When using torch T1, set up device or selector device S is manually adjusted by buttons 480, 482, 484 and 486 to provide the desired parameter for the welding operation of system A. Representative parameters are illustrated; however, a person skilled in the art could select other parameters to be controlled by a manual loading of register 470 on torch T1. In some implementations of this second embodiment, device S includes a button 490 for creating an identification code that is also written or loaded into register 470 to be communicated to the front end of set circuit 450. This code identifies a type of torch, but not a specific torch. By using this type code, set circuit 450 has a decoder front end and is enabled only upon receipt of a given type code by way of line 414 from memory register 470. This second embodiment of the invention allows adjustment of the desired welding parameter at the torch, either by a unit S formed integrally with the torch or by a separate unit S remote from the torch. A remote unit communicates with the torch by read line 472a during the setting operation.

The second embodiment provides unit capabilities. By storing parameters in register 470, torch T1 will automatically load parameters into controller 460 by merely connecting the torch to the welding system. To enhance this capability, a toggle mechanism 474 indexes menu storage device 476 to change the parameters stored in register or memory device 470. Device S can be a personalized POD which is loaded by a welder to a devised parameter set. Thus, the welder merely selects a torch and loads his parameters through line 472. Torch T1 will always be set into a condition preferred by the welder.

By using the invention a set of parameters can be loaded into any torch so the torch controls the weld process. In an alternative, the stored parameters of a torch can be changed as desired by any weld process. Other capabilities will be apparent to a person skilled in the welding art.

Figure 6:
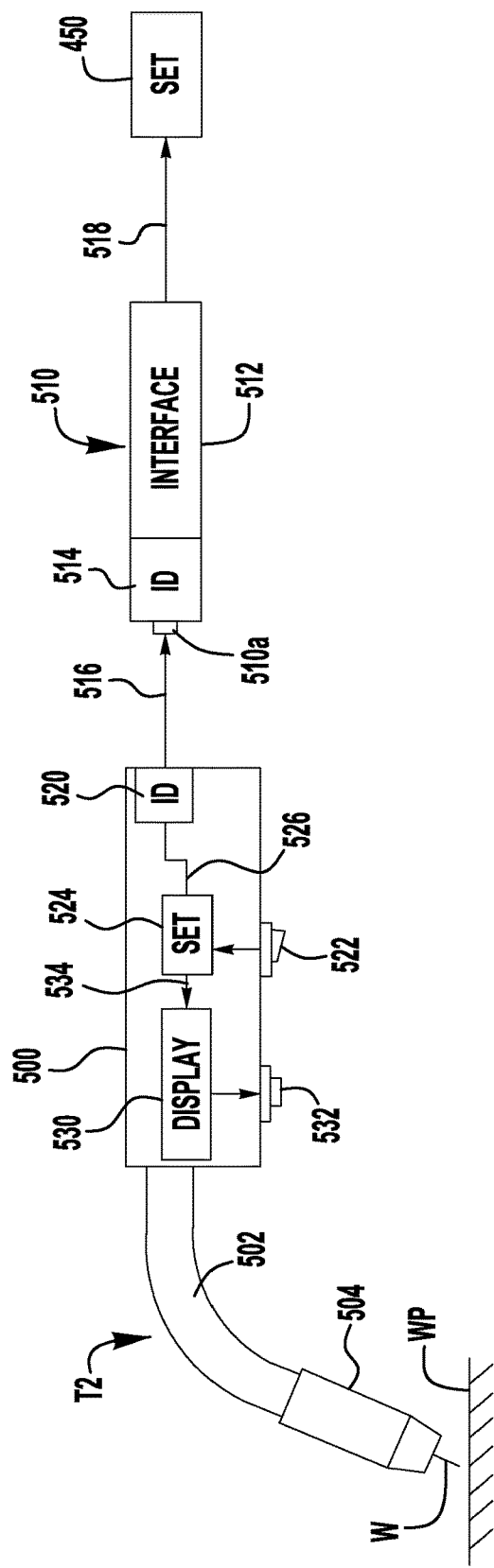
FIG. 6 is a schematic, combined wiring diagram and block diagram illustrating a third embodiment of the present invention.

A third embodiment of the present invention is illustrated in FIG. 6. This embodiment is somewhat similar to the second embodiment of the invention shown in FIG. 5 and has a common welding system and involves the same input set circuit 450. Attachment of torch T2 activates a desired welding process with selected parameters. To accomplish this objective, torch T2 includes a handle 500 having an outwardly projecting gooseneck 502 terminating in nozzle 504 for performing the welding operation between wire W and workpiece WP. In accordance with this embodiment, the rear end of the gun is connected to an interface module 510 having a storage output section 512 and an input identification circuit 514 to activate storage section 512 when receiving a selected code appearing on line 516 extending through the gun from torch T2. This gun is modified to communicate the identification code by line 516 when the torch is connected to the welding system. Thus, mere connection of the torch causes the input section 514 to activate interface module 510 for outputting digital data from section 512 on line 518. The data changes the parameters in set circuit 450 which is the same set circuit as shown in FIG. 5. Interface 510 is activated, in the preferred embodiment, by merely connecting line 516 to the module; however, in a practical implementation, line 516 is a communication channel between torch T2 and interface module 510 and receives digital data code from register 520 of torch T2. This register in one implementation merely stores a code. A code in digital format is communicated between register 520 and input identification circuit 514. In this implementation of the third embodiment, merely connecting torch T2 to the welding system activates module 510 because the code from the torch is identified by input circuit 514. In summary, section 512 is activated in one example by merely connecting the torch to the interface at the input side of the welding system. As illustrated, section 512 is activated by section 514 reading a specific code from the attached torch. Thus, the code for any torch used in these examples must have a special connector 510a. In the second example it must also have the ability to transmit a code recognizable by decoder section 512 of interface 510.

In accordance with another aspect of this third embodiment, storage memory register 520 is a read/write register so parameter toggle mechanism 522 is toggled to select desired parameters, such as the parameters shown in device S of FIG. 5. These parameters, after being selected and stored in memory circuit 524, are written into storage memory or register 520 from set circuit 524 by write line 526. In accordance with another aspect, handle 500 includes a register 530 to display the selected parameters on visual device 532. The visual data is based upon the data received from set circuit 524 through write line 534.

The third embodiment employs an interface module 510 that stores parameters for the welding process to be performed by the welding system. Module 510 has a front end for activation of the interface only when the front end receives selected input code from torch T2 attached to the front of the module. Torch T2 has a stored identification code in register 520 wherein the stored code matches the selected input code of circuit 514. By communication of a proper code from torch T2 to circuit 514, module 510 is activated. As a further aspect torch T2 has structure on the torch which structure includes a device for changing the stored parameters in section 512 of module 510. In a simplified version, the code concept is replaced by merely actuating the module by attaching the torch.

Figure 7:
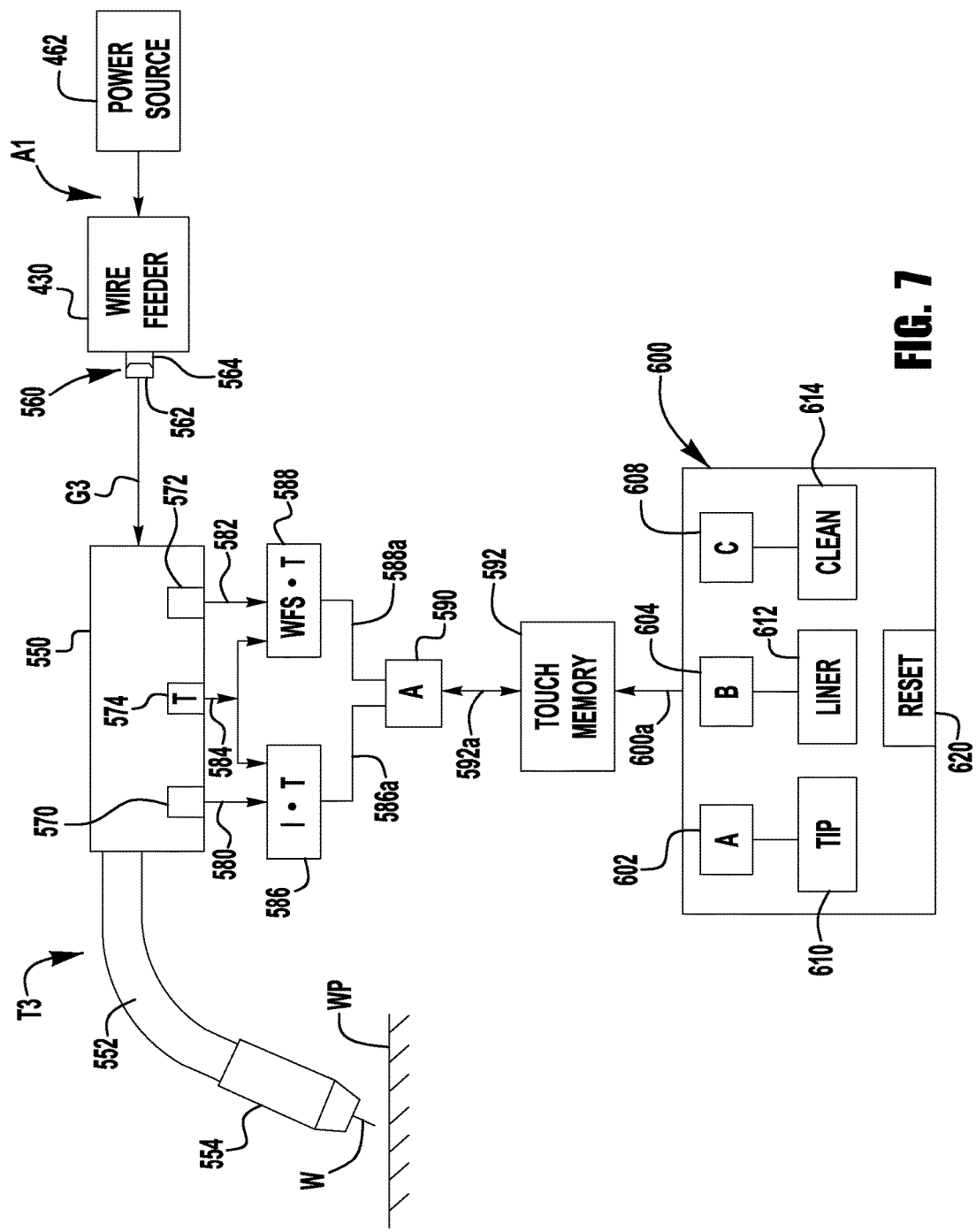
FIG. 7 is a schematic, combined wiring diagram and block diagram illustrating a fourth embodiment of the present invention.

The fourth embodiment of the present invention is illustrated in FIG. 7. Welding torch T3 is attached to welding system A1, as shown in FIGS. 5 and 6 and having wire feeder 430 and a power source 462. Torch T3 comprises handle 550 with gooseneck 552 and terminal end nozzle 554 and is connected to system A1 by gun G3 terminating in connector 560 having an input plug 562 and an outlet receptacle 564. This same type connector is used in the other embodiments of the present invention. The plug and receptacle have matching prong or pin patterns to assure component matching for proper coordination between the torch and the welding system. In this fourth embodiment, torch T3 includes a first sensor 570 for sensing a parameter illustrated as the welding current. Second sensor 572 senses another parameter indicated as wire feed speed. These two parameters are representative in nature to define the inventive characteristics of this embodiment. The sensors are coordinated with timer 574 so output lines 580, 582 and 584 have a combined parameter and time signal. Multiplication circuit 586 multiplies the value of arc current on line 580 by time of the current flow based upon reading from timer 754 as indicated by line 584. Thus, the output of circuit 586 on line 586a is the arc current multiplied by time during which current has been flowing through torch T3. In a like manner, multiplication circuit 588 multiplies a second parameter, indicated to be wire feed speed, by the time on line 584 so the value on output line 588a is the accumulated amount of wire fed through torch T3. Consequently, the magnitude of signals on lines 586a and 588a are indicative of use factor measurements for torch T3. These use factor measurement signals are accumulated in accumulator 590 and are read and reset by a memory device, shown as touch memory 592 through line 592a. Consequently, use factor signals accumulated for the two use related conditions are readable from storage and output device 592. The storage and output device is interrogated by monitor unit 600 containing stored levels associated with the two use factor signals from accumulator 590. This structure is similar to the structure and function illustrated and discussed with respect to the invention shown in FIG. 1. Comparator networks 602, 604 and 606 read the accumulated use factor signals in accumulator 590 by way of storage and memory device 592 to create action commands that are displayed on device 610, 612 and 614. In this manner, monitor unit 600 reads the use factor signals for torch T3 and displays the actions to be taken with respect to this torch. Unit 600 can be mounted at a remote console or at the welding operation. Accumulator 590 maintains the history of the use criteria for torch T3 until the accumulator is selectively reset. Reset is accomplished by a button 620 on monitor unit 600. Upon depressing button 620 and connecting unit 600 with accumulator 590 as illustrated by line 600a, accumulator 590 is reset for the particular torch T3. In this manner, the history of the torch T3 is maintained until the torch is refurbished or otherwise rehabilitated. Torch T3 has sensors 570, 572 to measure the level of current and the wire feed speed. It also has a timer 574 and a circuit 586 or 588 to combine one of more of these measurements as a product of time to develop one or more use factor signal or signals. Memory unit 592 accumulates the use factor signals so monitor unit 600 can read the use factor signals selectively for a given torch.

Figure 8:
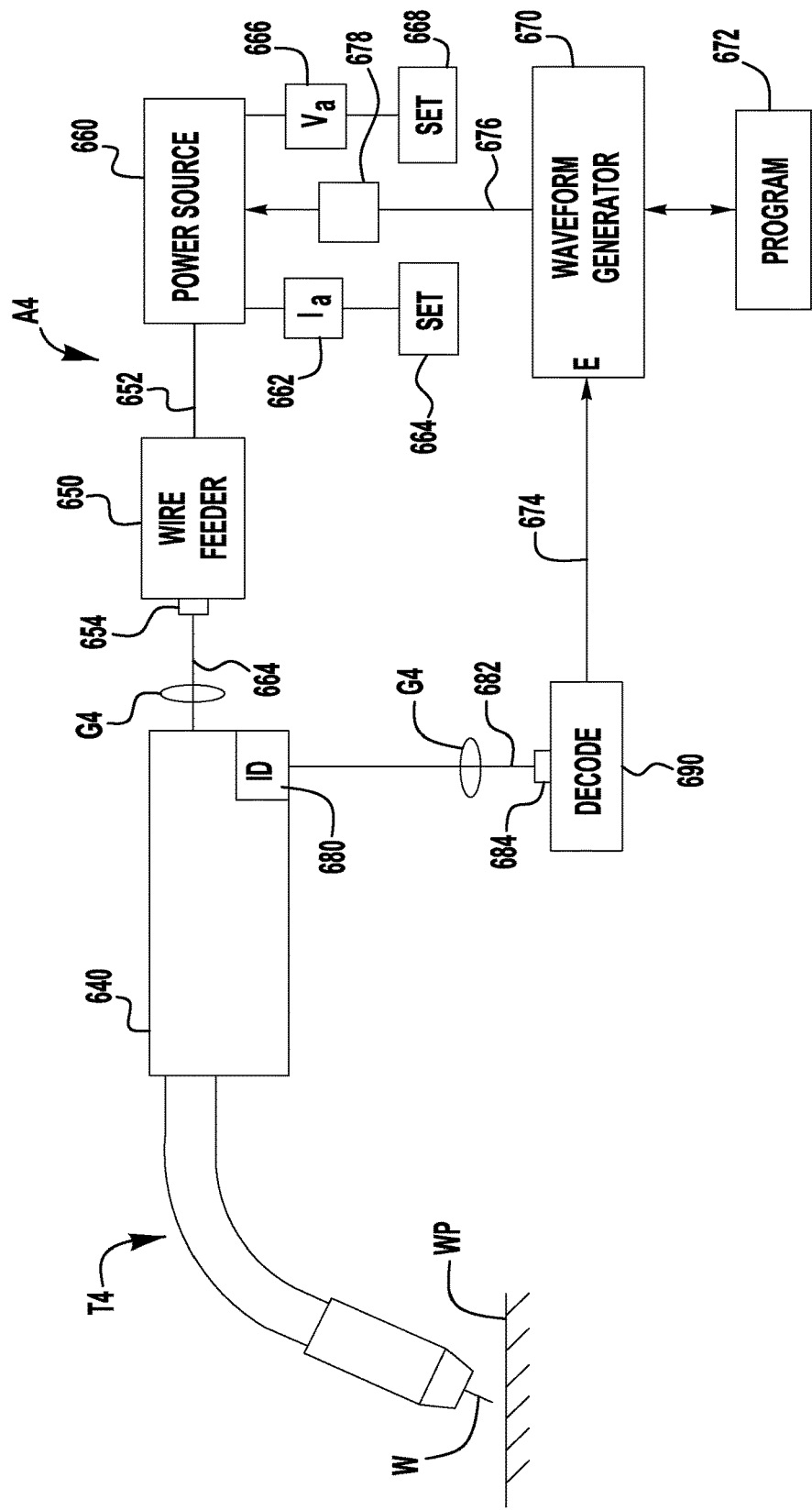
FIG. 8 is a schematic, combined wiring diagram and block diagram illustrating a fifth embodiment of the present invention.

The fifth embodiment is schematically illustrated in FIG. 8. Welding torch T4 has a handle 640 connected by gun G4 to welding system A4 which includes a wire feeder 650 and a power source 660. Power lead 652 is directed from power source 660 through wire feeder 650 to the power lead 664 in gun G4. Power source 660 is operated in accordance with standard practice with a standard controller. Arc current 662 is set by circuit 664. In a like manner, the arc voltage stage 666 is set by circuit 668. As so far described the controller of the power source 660 and also wire feeder 650 operates in accordance with standard practice by either current or voltage feedback. To illustrate the inventive nature of torch T4, power source 660 has a separate and distinct operating system, illustrated as a system using waveform generator 670 to process a selected waveform program from one of the stored programs in module 672. Thus, the power source has a standard operating procedure and a second control arrangement illustrated as a network including a waveform generator and other related well known components for using a waveform generator. See Fulmer U.S. Pat. No. 6,498,321 which is incorporated by reference. Network including generator 670 is enabled by a signal in line 674. To create this signal for shifting from standard operation to the special network operation, novel torch T4 is employed. Handle 640 includes a stored identification code in read/write register 680 which is communicated by line or channel 682 through the gun G4 to the welding system A4. The input of the welding system for line 682 is a connector 684 having a unique plug and matching receptacle. The same connector is illustrated as connector 654 at the input feeder 650. The unique connector 684 directs the coded digital information on line or channel 682 to the input side of welding system A4 illustrated as decoder 690. When the proper signal is received by decoder 690 an enable signal in line 674 activates special process network 670. By using torch T4 attached to welding system A4, power source 660 is converted from a standard control operation to a higher level control protocol. Thus, gun G4 having a front end terminating at torch T4 is connected to welding system A4. The system automatically shifts into a high technology control protocol. The use of the high level protocol is indicated by line 676 extending from network 670. If this protocol is deactivated, a signal is directed to circuit 678 to shift from the high protocol to the normal operation for power source 660.

As indicated previously, embodiments of the present invention as described above can also be implemented in a cutting system—such as a plasma cutting system, without departing from the spirit or scope of the present invention. Aspects of this will now be discussed below. However, the above discussions will not be repeated for cutting systems, to avoid needless repetition.

Figure 9:
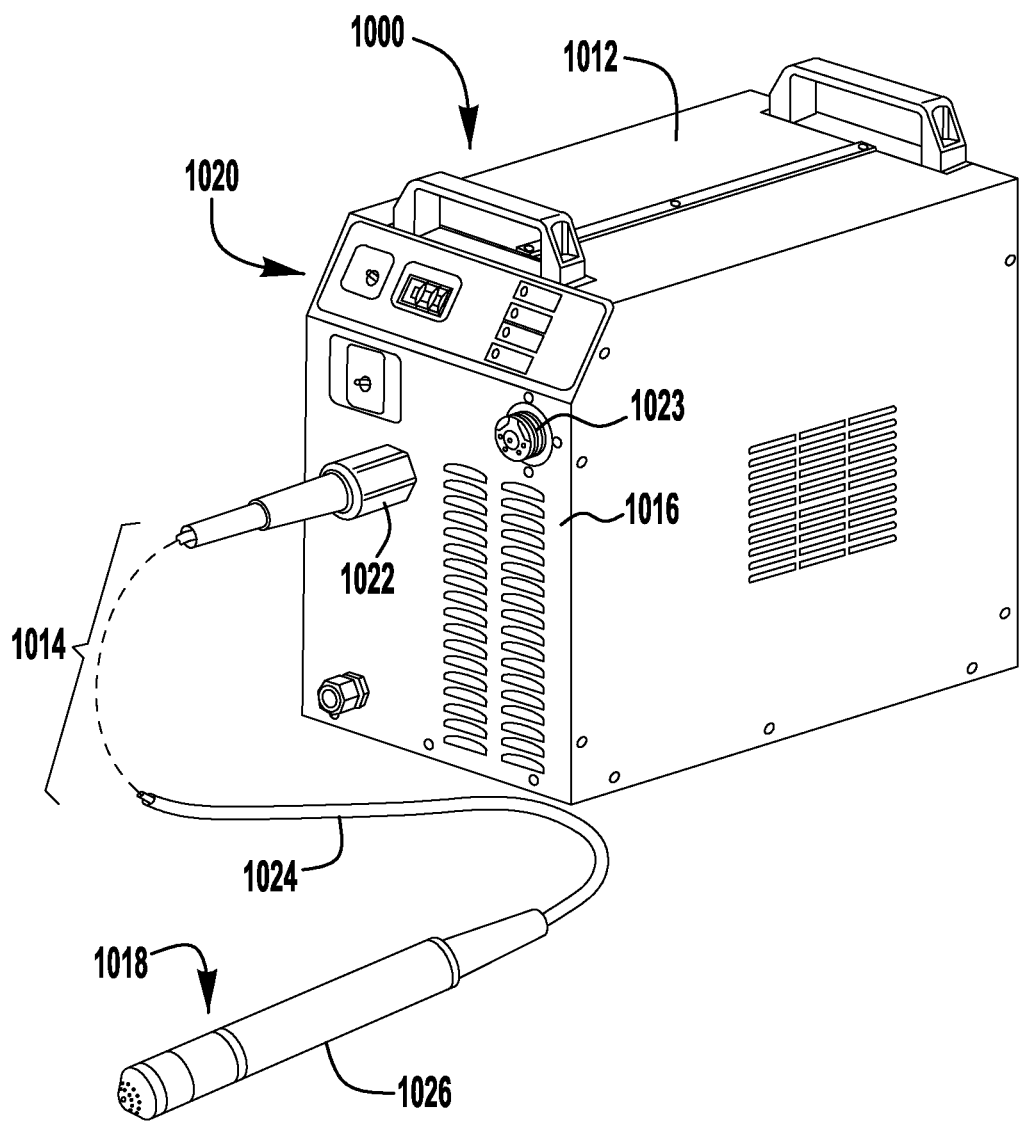
FIG. 9 is a diagrammatical representation of a cutting system incorporating embodiments of the present invention.

Turning now to FIG. 9, it shows one example of a plasma arc torch device 1000. As shown, device 1000 includes a housing 1012 with a connected torch assembly 1014. Housing 1012 includes the various conventional components for controlling a plasma arc torch, such as a power supply, a plasma starting circuit, air regulators, fuses, transistors, input and output electrical and gas connectors, controllers and circuit boards, etc. Torch assembly 1014 is attached to a front side 1016 of housing. Torch assembly 1014 includes within it electrical connectors to connect an electrode and a nozzle within the torch end 1018 to electrical connectors within housing 1012. Separate electrical pathways may be provided for a pilot arc and a working arc, with switching elements provided within housing 1012. A gas conduit is also present within torch assembly to transfer the gas that becomes the plasma arc to the torch tip, as will be discussed later. Various user input devices 1020 such as buttons, switches and/or dials may be provided on housing 1012, along with various electrical and gas connectors.

It should be understood that the housing 1012 illustrated in FIG. 9 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 9, torch assembly 1014 includes a connector 1022 at one end for attaching to a mating connector 1023 of housing 1012. When connected in such way, the various electrical and gas passageways through the hose portion 1024 of torch assembly 14 are connected so as to place the relevant portions of torch body 1026 in connection with the relevant portions within housing 1012.

Figure 10:
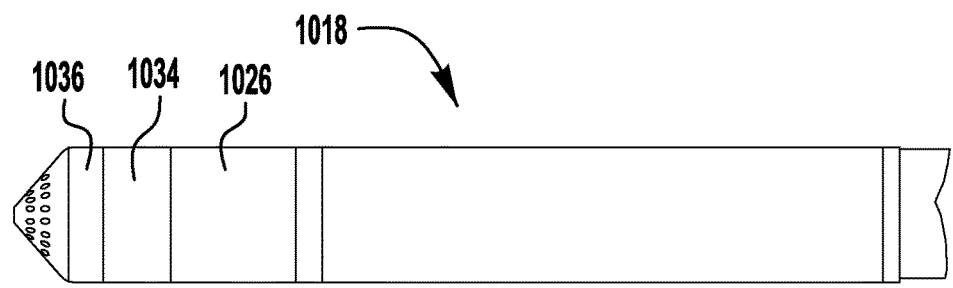
FIG. 10 is a diagrammatical representation of a cutting torch that can be used with the system of FIG. 10.
Figure 11:
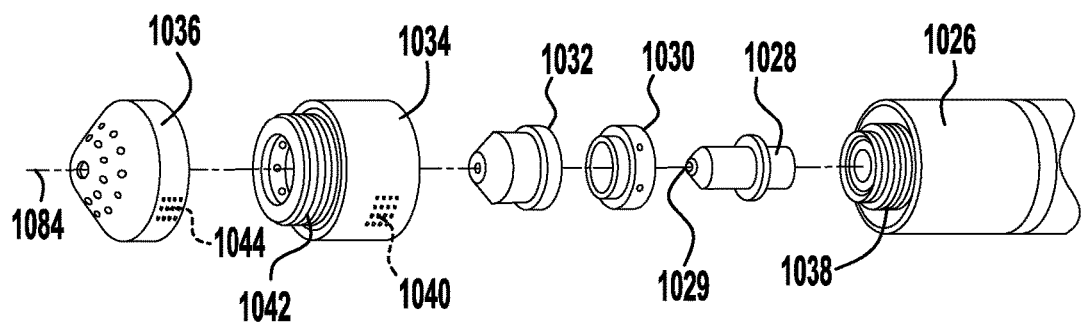
FIG. 11 is a diagrammatical representation of an exploded view of the cutting torch of FIG. 11.

FIG. 11 shows an exploded view of the end of torch body 1026. As shown therein, attached to torch body 1026 are electrode 1028, swirl ring 1030, nozzle 1032, retaining cap 1034, and shield cap 1036. Inserted into the tip of the electrode 1028 is an insert 1029, which is typically made from hafnium, from which a plasma jet originates during cutting. First mating threads 1038 and 1040 on torch body 1026 and retaining cap 1034, and second mating threads 1042 and 1044 on retaining cap 1034 and shield cap 1036 may be used to hold these pieces together on the end of torch body 1026 in the configuration shown in FIG. 10. The sizes, dimensions and arrangements of these elements may be varied somewhat depending on the desired amperage, flow, work to be performed, etc. as is conventional, and additional parts may be employed in some arrangements depending on the application.

Figure 12:
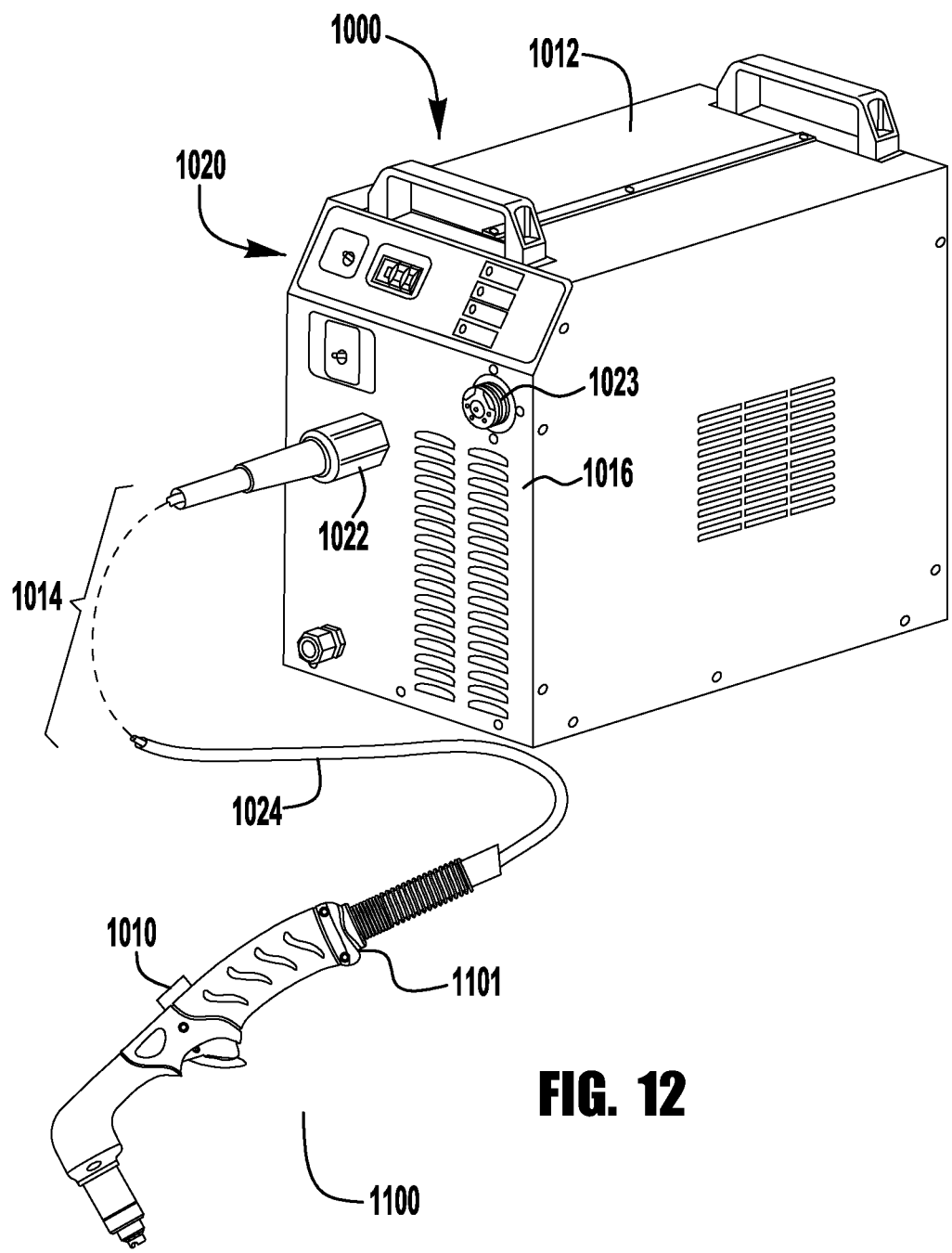
FIG. 12 is a diagrammatical representation of a handheld cutting system incorporating exemplary embodiments of the present invention.

FIG. 12 is similar to FIG. 9, but shows a handheld torch 1100 and connection 1101, which can also be used with exemplary embodiments of the present invention. The torch 1100 also has an indicator 1010, which will be explained further below.

Similar to the maintenance and wear issues that can be experienced by welding torches and systems, these issues can occur during cutting processes as well. For example, components of the torch; such as the electrode 1028, hafnium insert 1029, nozzle 1032 and/or shield 1036 can degrade over time, or be damaged during an anomaly or event during cutting. Such events can include when the plasma jet contacts the nozzle and/or the shield, or can include when the torch impacts the workpiece—for example when it is attached to a robotic system. These events can occur due to a number of reasons, and can severely damage the torch or its components. Therefore, embodiments of the present invention monitor various cutting processes and parameters (similar to that described above for welding) so that a user can be informed of a possible failure in the torch before it occurs.

For example, embodiments of the present invention use a controller 42 to monitor cutting system functions/operations including (but not limited to): usage time (e.g., a usage time of the torch), cutting amperage, arc starts, torch pierces, side cuts, etc. Based on the monitored parameters the system can inform the user, via a user interface (or other means) that the torch, or specific components of the torch (such as the nozzle, electrode and/or shield) have reached, or will reach, the end of their operational life. Further, the controller 42 can monitor various anomalies that may occur during a cutting process. For example, the torch can be equipped with accelerometers (or other movement measurement devices) that can determine if the torch has impacted a workpiece, along with the force of the impact. The controller 42 can then determine if the impact was of sufficient magnitude to warrant either inspection or replacement of the torch. Further, the controller 42 can monitor other operational anomalies that can occur during operation, such as when the plasma jet becomes unstable and impacts the nozzle within the torch. This impact can severely damage the nozzle and diminish its operational life quickly. Thus, the controller 42 monitors the output voltage and current during the cutting operation and determines if a plasma jet anomaly has occurred—and its intensity and duration. Such anomalies can include burn backs or plasma jet shorts. Based on this information, the controller 42 can then determine if the user is to be notified of the need to replace the torch, or components thereof.

It is noted that in other exemplary embodiments, at least one temperature sensor is mounted to monitor a temperature of the torch, or some of its components. This temperature sensor data can also be used by the controller 42 to factor into the calculated life or the components.

In exemplary embodiments of the present invention, the cutting system contains a memory which is coupled to the controller 42 (or can be integral to the controller 42) which contains data to allow the controller to determine the remaining operational life of various torch components. For example, the memory can contain look up and/or state tables which, when used, allow the controller to predict the failure of torch components. In other embodiments, various algorithms can be used by the controller for this predictive analysis. Much of this information is typically preprogrammed into the controller 42/system based on historical and empirical data. For example, for different torches, electrodes, nozzles and/or shields there can be stored data, look up tables, etc. used by the controller 42 which make it possible for the controller 42 to determine an operational life of the components based on the type and parameters of usage. In such embodiments, the controller 42 recognizes the torch and/or its components and then monitors various usage parameters for that torch. As the torch and/or its components reach a threshold of usage—as determined by the controller 42—the user is notified. That is, in embodiments of the present invention, the controller 42 can determine if any of the components of the torch, or the torch itself, has reached a wear threshold level—beyond which there is a likelihood that the torch will fail. Once the wear threshold level is reached the user is notified. In exemplary embodiments of the present invention, the determination of whether or not the torch (or its components) have reached a wear threshold level is based on any one, or all, of: cutting current, arc starts, pierces, side cuts, usage time, torch impact, plasma jet anomalies. The controller 42 weighs each of the monitored parameters consistent with its programmed methodology (look up table, algorithm, etc.) and determines if a wear threshold level has been reached. If the level has been reached the controller 42 causes the user to be notified.

In exemplary embodiments of the present invention, the controller 42 can determined the wear threshold level for the torch assembly and/or any of its individual components, such as the electrode, nozzle and/or shield.

To further explain exemplary embodiments of the present invention, the following is an example of how an embodiment of the present can be used.

During operation a user can connect a cutting torch to the cutting power supply (or simply turn on the system with a torch attached). Consistent with embodiments identified above, the power supply can recognize the torch that has been connected—it can recognize the type, as well as some of the components of the torch, such as electrode type, nozzle type, shield type, etc. Alternatively, the user can input data regarding the torch and/or its components into the user interface of the power supply. For example, the user can input the torch or components type and its condition —e.g., "new". Upon recognition (or user input) the controller 42 can access its memory (or any other memory in the system) to determine if the attached torch has already had some use. If the torch and/or its components are new then the controller 42 sets the wear value for the component at a beginning value (e.g., 0). If the torch has been previously used, the controller 42 can use the individual identifier for the torch to retrieve the wear data for the torch and/or its components at the conclusion of its last use. If the wear value for the torch is below its wear threshold value, then the controller 42 does not provide any indication to the user to replace any components or the torch. Alternatively, in other exemplary embodiments, the system can use a user display (for example on the power supply) to provide a visual indication as to the status of the torch. For example, the user display can show a green light indicating that the torch is acceptable to use. If the torch and/or its components have exceeded their respective wear threshold value then the controller 42 can cause an indication to be provided to the user via the user interface, or via another communication method—for example a remote positioned display. For example, the controller 42 can cause a red light indicator to be displayed on the power supply. In a further exemplary embodiment, the indicator 1010 can be placed on the handheld torch 1100, as shown in FIG. 12. This will ensure that the user is made aware that the wear threshold value of the torch has been reached prior to use. This will allow the user to replace the torch and/or some of its components (e.g., electrode, nozzle, and/or shield). In some embodiments, the controller 42 can disable the use of the cutting system until the torch and/or its components are changed. When the torch and/or torch components are changed, the user can then enter this information via the user interface to allow the controller 42 to reset the wear value of the torch/components. For example, a user could input that an electrode replaced, the controller will reset the electrode wear value.

During operation, as described above, the controller 42 monitors various operational parameters and updates the wear data for the torch during the cutting process. For example, the controller 42 monitors any one, or combination, of the number of pierces, side cuts, current, voltage, heat, plasma jet anomaly events, usage time, during the use of the torch. For example, the controller 42 can record and update the wear data for the torch when the torch was used at 150 amps for 3 hours, with 5 pierces and 10 side cuts. Thus, in some exemplary embodiments, the controller 42 can be updating the wear value for the torch regularly during an operation, and can be recording that information in a memory. The controller 42 can use a preset sampling rate for updating the wear data for the torch. In exemplary embodiments, as the cutting process continues the wear data is updated, and if during cutting the wear threshold value for the torch and/or its components is reached the controller can provide an indication to a user via various means.

In some exemplary embodiments, a wear threshold value can be set separately for the torch and its components. In some applications, certain torch components (e.g., shield) will last longer than others (e.g., electrode) during certain operations. Thus, in some exemplary embodiments, each component of the torch, and perhaps the torch as a whole, have a separate wear threshold value and when each respective value is reached the controller 42 can indicate that to the user. In such embodiments, a user need only replace those torch components that require replacement.

With exemplary embodiments of the present invention, problems during cutting operations—which stem from components that have deteriorated past their usable life—can be avoided. For example, arc start failure of cut degradation can be avoided.

In further exemplary embodiments, the controller 42 can provide wear information to a user prior to an operation beginning so that a user can determine if the torch, or a component, may fail during an upcoming operation or work day. For example, as stated above the controller 42 can record and retain wear information for torches and their respective components, and prior to a cutting operation a user can use the user interface to check the wear status of a connected torch or its components. That is, prior to starting an operation a user could find out that a torch electrode has 30 more cutting hours prior to reaching its wear threshold. This will allow a user to determine whether or not a torch can be used for an upcoming operation.

In further exemplary embodiments, the controller 42 utilizes at least two wear threshold values for the torch and/or its components. That is, a first wear threshold value is set at a wear value where the component (torch, electrode, etc.) still has an amount of usable life remaining, but is reaching an unusable state, whereas a second wear threshold value is set, as described above, close to the end of the usable life for the torch/components. In such exemplary embodiments, the controller 42 would provide a first indication (e.g., a yellow light indication) when the first wear threshold value is reached, and a second indication (e.g., a red light indication) when the second wear threshold value is reached.

As explained previously, the above-described techniques can be implemented in the controller 42, or any other computer controlled system, using digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, it should be understood that various changes in form and detail may be made without departing from the spirit and scope of the invention.

What is claimed is:

1. A cutting system comprising:
   a plasma arc torch having an electrode, nozzle, and a gas conduit through which gas is transferred to a torch tip, the torch including a sensor and a set circuit, where the set circuit stores a parameter related to the torch;
   a power supply outputting a cutting waveform to the electrode via an electrical connector to initiate a working arc, the working arc creating a plasma arc using the gas;
   a controller which controls an output of the power supply and a feeding of the gas through the gas conduit based upon input from a user input device positioned on at least one of the torch and the power supply, wherein the controller is configured to monitor usage parameters; and
   a memory device, coupled to the controller, to store data related to the usage parameters,
   wherein the usage parameters include a cutting amperage, a number of torch pierces, and an operating anomaly event,
   wherein the controller utilizes a first wear threshold value for the torch and a second wear threshold value for a component of the torch, wherein the first wear threshold value is different from the second wear threshold value,
   wherein the controller uses the data related to the usage parameters to determine information related to an operating life of both of the torch and a component of the torch, and
   wherein the controller determines whether the first wear threshold level for the torch and the second wear threshold level for the component of the torch have been exceeded based on the information related to the operating life.

2. The system of claim 1, wherein the memory device stores data related to the operating anomaly event, and the operating anomaly event relates to one of a force delivered to the torch on an impact, an output voltage of the power supply, an output current of the power supply, and a temperature of the torch.

3. The system of claim 1, wherein the controller records and updates the data related to the usage parameters during cutting operations.

4. The system of claim 1, wherein the plasma arc torch further includes a swirl ring, a retaining cap, and a shield cap, and
   wherein the controller uses the data related to the usage parameters to determine information related to an operating life of at least one of the electrode, the nozzle, the swirl ring, the retaining cap, and the shield cap.

5. The system of claim 1, wherein the information related to the operating life includes at least one of information that an end of operating life has been reached, information that an end of operating life will be reached, information relating to an amount of useful operating life that is remaining, wear indication of at least one of the torch or the component of the torch, and information concerning a predicted failure.

6. The system of claim 5, wherein the controller performs predicative analysis to determine the information related to the operating life based on at least one of a look-up table, a state table, and an algorithm that is stored in the memory device.

7. The system of claim 1, wherein the memory device is physically located in the controller,
   wherein the parameter stored in the set circuit uniquely identifies the torch, and
   wherein the stored data in the memory device is updated when the torch is attached to the power supply and the controller identifies the torch based on the parameter stored in the set circuit.

8. The system of claim 1, wherein the memory device is physically located in the torch and the stored data is updated when the torch is attached to the power supply.

9. The system of claim 1, wherein the sensor is an accelerometer to measure a force of impact of the torch, and
   wherein the controller determines whether the torch impacted an external object based on the measurement.

10. The system of claim 9, wherein the controller determines whether to inspect or replace the torch or a component of the torch based on a magnitude of the measurement.

11. The system of claim 1, wherein the sensor is a temperature sensor that measures at least one of a temperature of the torch and a temperature of a component of the torch.

12. The system of claim 11, wherein the controller uses the measured temperature to calculate data related to an operational life of at least one of the torch and the component of the torch.

13. The system of claim 1, wherein the controller determines whether a plasma jet anomaly has occurred based on at least one of a cutting voltage and a cutting current.

14. The system of claim 13, wherein the controller determines whether to inspect or replace the torch or a component of the torch based on the plasma jet anomaly.

15. The system of claim 14, wherein the plasma jet anomaly is at least one of a burn back and a plasma jet short.

16. The system of claim 1, wherein the set circuit includes information that allows the controller to identify at least one of a torch type, an electrode type, a nozzle type, and a shield type.

17. The system of claim 1, wherein the data related to the usage parameters is reset to a value indicating a new condition if the torch has been replaced or refurbished.

18. The system of claim 1, further comprising a user display, wherein the user display provides a status of the torch, the status including at least one of an indication that the torch is ready to use, an indication that the torch or the component of the torch is nearing an end of useful life, and an indication that the torch or the component of the torch needs to be replaced.

19. A cutting method comprising:
   creating a working arc using a plasma arc torch having an electrode, nozzle, and a gas conduit through which gas is transferred to a torch tip, the torch including a sensor and a set circuit, where the set circuit stores a parameter related to the torch;
   providing a cutting waveform from a power source to the electrode via an electrical connector to initiate the working arc using the gas;
   inputting user preferences on at least one of the torch and the power supply;
   controlling the cutting waveform and a feeding of the gas through the gas conduit based upon the user preferences;
   monitoring usage parameters; and
   storing data related to the usage parameters on a memory device,
   wherein the usage parameters include a cutting amperage, a number of torch pierces, and an operating anomaly event
   using the data related to the usage parameters to determine information related to an operating life of both of the torch and a component of the torch, determining whether a first wear threshold value for the torch has been exceeded based on the information related to the operating life;

determining whether a second wear threshold value for the component of the torch has been exceeded based on the information related to the operating life, wherein the first wear threshold value for the torch is different from the second wear threshold value for the component of the torch.

20. The method of claim 19, further comprising recording and updating the data related to the usage parameters during cutting operations.

21. The method of claim 19, wherein the information related to the operating life includes at least one of information that an end of operating life has been reached, information that an end of operating life will be reached, information relating to an amount of useful operating life that is remaining, wear indication of at least one of the torch or the component of the torch, and information concerning a predicted failure.

22. The method of claim 21, further comprising performing predictive analysis to determine the information related to the operating life based on at least one of a look-up-table, a state table, and an algorithm that is stored in the memory device.

23. The method of claim 19, further comprising uniquely identifying the torch based on the parameter stored in the set circuit, and updating the stored data in the memory device when the torch is attached to the power source.

24. The method of claim 19, further comprising identifying at least one of a torch type, and electrode type, a nozzle type, and a shield type based on at least information stored in the set circuit.

25. The method of claim19, further comprising resetting the data related to the usage parameters to a value indicating a new condition when the torch has been replaced or refurbished.

26. The method of claim 19, further comprising displaying a status of the torch, the status including at least one of an indication that the torch is ready to use, an indication that the torch or the component of the torch is nearing an end of useful life, and an indication that the torch or the component of the torch needs to be replaced.

* * * * *